Patented Apr. 4, 1944

2,345,597

UNITED STATES PATENT OFFICE 2,345,597

PHENOL-RUBBER CONTAINING COMPOSITION

Jesse Harmon, Wilmington, Del., assignor to E. I. du Pont de Nemours & Company, Wilmington, Del., a corporation of Delaware No Drawing. Application June 21, 1941, Serial No. 399,239

11 Claims. (Cl. 260—3)

This invention relates to a reaction product of phenolic material and rubber, especially to a means of prolonging its utility. More particularly, it appertains to the incorporation of amino-nitrogen-containing polymers in rubber-phenol condensation products to extend the serviceableness of the latter.

When rubber is worked on a rubber mill (or related apparatus, such as a Banbury mixer) with about 5% to 55% its weight of beta-naphthol (or similar monohydric phenol) in the presence of a small amount of a special catalyst, for example, di-hydroxy-fluoroboric acid or sulfuric acid, for about 15 minutes at 100° C., a material is obtained which is quite unlike rubber and the heretofore known rubber derivatives (including the products known as rubber isomers). The new material, being denser, sinks when placed in water, will not adhere to rubber, is more soluble in hydrocarbon solvents than cyclized rubber (J. I. E. C. XXXIII, 389), and when mixed with rubber on a mill and the mixture made into a thin cement, layers off. The material seems to be an alkylated phenol (rubber being the alkylating agent), since the phenol molecule seems to have chemically combined with the rubber molecule (probably at what was an unsaturated carbon atom in ordinary rubber).

This material, for convenience referred to as "Phenol Rubber Product 2,158,530," or more simply, "phenol rubber product," is of interest in many fields, for example, as a cementing agent (binder, coherent-film forming material) in coating compositions, as the principal component of adhesive compositions, etc. The fact that it discolors, particularly when subjected to sunlight and/or heat, has hindered its use commercially. Adhesive bonds made of this substance (alone or even when compounded with conventional adhesive materials) are initially very good, but they weaken rapidly, indicating that it suffers some deleterious molecular change with age. This also has retarded the expansion of its employment.

It was first assumed that the change in properties of the phenol-rubber product compositions resulted from an oxidizing action, particularly under conditions involving light and heat, and efforts were made to maintain such products in their initial condition by incorporating anti-oxidants therein. The slight extent (if any) of the improvement obtained in such a manner was discouraging. The time elapsing before loss of heat sealing properties increased only about five fold, as a maximum. The results so far as discoloration was concerned were equally disappointing. Other undesirable features of these efforts were difficulties in application of the compositions, objectionable lowering of the softening point of adhesive compositions, inability of the compounded material to withstand shock.

This invention had for an object the stabilization of phenol-rubber products. Other objects were to increase the utility and lengthen the useful life of phenol-rubber products, the preparation of heat-, age- and oxidation-resistant adhesives and transparent coating compositions, and the manufacture of adhesives having outstanding power to adhere plain and moistureproofed regenerated cellulose, plain and wax-impregnated paper, and like sheet materials. A general advance in the art, and other objects which will appear hereinafter, are also contemplated.

It has now been found that the color in phenol-rubber products can be restrained (avoided, eliminated, prevented, inhibited, curbed, repressed, obviated) and such products stabilized and their useful life very greatly lengthened, by compounding or diluting them with certain amino polymers. The polymeric amino substances are mostly synthetic resins derived from ammonia and/or monomeric amino nitrogen-containing bodies which are capable of being formed into coherent films, and which are substantially insoluble in water and soluble in 2% aqueous acetic acid and organic solvents. The amino nitrogen may be primary, secondary or tertiary, and may be part of an open chain or of a cyclic molecular structure.

How the foregoing objects and related ends are accomplished will be apparent from the following exposition, in which are disclosed the principle and divers embodiments of the invention, including the best mode contemplated for carrying out the same. Parts are given by weight throughout the application unless otherwise specified.

*Example I*

A batch of beta naphthol rubber product was prepared according to Example X of U. S. A. Patent No. 2,158,530. Twenty-five (25) parts of this material and 6.2 parts of phenol formaldehyde methyl amine resin (prepared according to Example I of U. S. A. Patent No. 2,098,869) were dissolved in 81.2 parts of toluene.

This composition was applied to paper, leather, waxed paper, metal foil (aluminum, tin and lead) regenerated cellulose sheet and low substituted cellulose ethers (methyl, ethyl, glycol and glycolic acid) by means of brushes, rollers and doctor knives. The deposited coatings were non-tacky, waterproof and flexible. When moistened with toluene or when subjected to heat and pressure excellent adhesion to a variety of surfaces, including wood and those mentioned above, was obtained. The improvement (in the life of the bond) was 25-fold over the same composition omitting the amine polymer.

*Example II*

Twenty-five (25) parts of the beta naphthol rubber product prepared according to Example X of U. S. A. Patent No. 2,158,530, and 6.2 parts of phenol formaldehyde methyl amine resin prepared according to Example I of U. S. A. Patent No. 2,098,869, were dissolved in 81.2 parts of toluene. Sulfite paper (35 pound type) was coated with 0.002 to 0.003 inch of the resulting composition. The coated paper was then aged at 65° C., and adhesive tests were made on aliquot parts of this composition at intervals of 3 to 5 days. It was 13 days before the coated paper no longer adhered tenaciously to shot gun shell paper stock.

*Example III*

Rubber was reacted with 17% of its weight of beta naphthol in the manner described in U. S. A. Patent No. 2,158,530. The resulting material was made into a cement having the composition:

| | Parts |
|---|---|
| Beta naphthol rubber product | 4 |
| Dimethyl-aminoethyl methacrylate polymer (made according to U. S. A. Patents Nos. 2,138,762–3) | 1 |
| Chlorinated diphenyl (62% chlorine, 1.646 to 1.653 specific gravity) | 4 |
| Chlorinated paraffin wax (35% chlorine) | 1 |
| Toluene | 14 |

This composition, after removal of the volatile solvent, was particularly useful as a pressure sensitive adhesive for sealing together two surfaces of regenerated cellulose film. Similar results were also obtained when the regenerated cellulose film was of the moistureproof variety, i. e., when it had been coated with a thin, continuous film of a moistureproofing coating composition such as that described in U. S. A. Patent No. 1,737,187 (Charch & Prindle). Regenerated cellulose sheet, laminated with the aforementioned composition as a bonding agent, had satisfactory flexibility, durability, and like characteristics.

*Example IV*

More of the beta naphthol rubber product of Example II was made into a solution or dispersion having the composition:

| | Parts |
|---|---|
| Beta naphthol rubber product | 2 |
| Dibutyl aminoethyl methacrylate polymer (made according to U. S. A. Patents Nos. 2,138,762–3) | 5 |
| Chlorinated diphenyl (same plastic semi-solid material as in Ex. III) | 3 |
| Benzene | 7 |

This composition was found to be a good laminating adhesive for laminating regenerated cellulose sheet to regenerated cellulose sheet and to paper. It was also especially suitable for adhering labels and the like to regenerated cellulose sheet wrapping material.

*Example V*

Some of the beta naphthol rubber product described in Example II was purified by extracting all the beta naphthol from the reaction mixture with a suitable solvent (for example, ethanol) for the beta naphthol. The resulting material was made into a composition consisting of:

| | Parts |
|---|---|
| Beta naphthol rubber product (purified) | 10 |
| Dicyclohexyl-aminoethyl methacrylate polymer (made according to U. S. A. Patents Nos. 2,138,762–3) | 5 |
| Pale crepe rubber | 10 |
| Chlorinated paraffin wax (35% chlorine) | 5 |
| Toluene | 100 |

This composition was especially suitable for laminating regenerated cellulose webs (either plain or moistureproof).

*Example VI*

A composition consisting of:

| | Parts |
|---|---|
| Beta naphthol rubber product (purified as described in Example V) | 25 |
| Diethyl aminoethyl methacrylate polymer (made according to U. S. A. Patents Nos. 2,138,762–3) | 6 |
| Rosin | 18 |
| Chlorinated paraffin wax (35% chlorine) | 10 |
| Ethylene dichloride | 70 | was prepared. It was well adapted for sealing regenerated cellulose wrappings (whether moistureproofed or not) on packages and for making bags from regenerated cellulose film (whether moistureproofed or not). It was also suitable for adhering labels to regenerated cellulose film (whether moistureproofed or not).

*Example VII*

A composition consisting of:

| | Parts |
|---|---|
| Beta naphthol rubber product (prepared from 100 parts rubber, 20 parts beta naphthol and 4 parts sulfuric acid) | 25 |
| Triethanol amine phthalate | 5 |
| Rosin | 20 |
| Toluene | 70 | was prepared. It was particularly useful for laminating regenerated cellulose to paper.

*Example VIII*

A composition consisting of:

| | Parts |
|---|---|
| Beta naphthol rubber product (purified as described in Ex. V) | 4 |
| Phenol formaldehyde methyl amine resin (U. S. A. Patent No. 2,098,869; Ex. I) | 1 |
| Hydrogenated methyl abietate | 1 |
| Toluene | 7 | was prepared. It was employed for laminating regenerated cellulose film to paper with satisfactory results.

*Example IX*

A composition consisting of:

| | Parts |
|---|---|
| Beta naphthol rubber product (purified as described in Ex. V) | 10 |
| Diphenyl guanidine formaldehyde resin | 1 |
| Benzene | 80 | was used for laminating plain, regenerated cellulose web and paper, with very satisfactory results.

*Example X*

A composition consisting of:

| | Parts |
|---|---|
| Beta naphthol rubber product (purified as described in Ex. V) | 25 |
| Phenol formaldehyde piperazine resin | 3 |
| Rosin | 18 |
| Chlorinated paraffin wax (35% chlorine) | 10 |
| Ethylene dichloride | 70 | was used for sealing regenerated cellulose wrappings on packages, making bags from regenerated cellulose film, and for adhering labels to regenerated cellulose film. Excellent results were obtained in each of these uses, whether the regenerated cellulose sheet material was plain or moistureproofed.

*Example XI*

A composition consisting of:

| | Parts |
|---|---|
| Phenol (carbolic acid, hydroxybenzene) rubber product (prepared by working 100 parts rubber and 40 parts phenol together on a rubber mill with 4 parts of di-hydroxy-fluoro-boric acid and extracting uncombined phenol) | 20 |
| Phenol formaldehyde piperazine resin | 2 |
| Chlorinated diphenyl (same plastic semi-solid material used in Ex. III) | 3 |
| Benzene | 7 | was found to behave similarly to the composition described in Example X.

*Example XII*

A composition consisting of:

| | Parts |
|---|---|
| Beta naphthol rubber product (purified as described in Example V) | 10 |
| Diphenyl guanidine formaldehyde resin | 5 |
| Pale crepe rubber | 10 |
| Rosin | 18 |
| Chlorinated paraffin wax (35% chlorine) | 5 |
| Toluene | 100 | was prepared and found to have properties which rendered it suitable for the uses described in Example III.

*Example XIII*

Some of the beta naphthol rubber product of Example III was made into a composition consisting of:

| | Parts |
|---|---|
| Beta naphthol rubber product (purified as described in Example V) | 4 |
| Diethyl aminoethyl methacrylate polymer (prepared according to U. S. A. Patents Nos. 2,138,762-3) | 1 |
| Chlorinated diphenyl (same plastic semi-solid material used in Ex. III) | 4 |
| Chlorinated paraffin wax (35% chlorine) | 1 |
| Toluene | 14 |

Both plain and moistureproofed regenerated cellulose film could be satisfactorily laminated with this composition, which was also particularly useful as a pressure sensitive adhesive for sealing together two surfaces of such material.

*Example XIV*

A moistureproofing coating composition was prepared by dissolving:

| | Parts |
|---|---|
| Beta naphthol rubber product [prepared by milling beta naphthol (10 parts), rubber (100 parts) and sulfuric acid (4 parts) in the manner described in U. S. A. Patent No. 2,158,530 (Williams), and thereafter extracting the excess beta naphthol with ethanol] | 90 |
| Dimethyl-aminoethyl methacrylate polymer | 3 |
| Paraffin wax (M. P. 61° C.) | 10 | in toluene. The solution was applied as a coating to a transparent sheet of regenerated cellulose 0.00088 of an inch in thickness. The coating was leveled by passing the covered sheet under a doctor knife, which removed the excess coating composition. The resulting coated sheet was then introduced into a drier through which air was circulating and where, after a rapid rise in temperature, the coating was dried at a temperature above the melting point of the wax.

*Example XV*

A moistureproofing coating composition was prepared by dissolving:

| | Parts |
|---|---|
| Beta naphthol rubber product (Ex. XIV type) | 90 |
| Phenol formaldehyde methylamine resin | 3 |
| Paraffin wax (M. P. 61° C.) | 10 | in toluene. The solution was applied as a coating to a transparent sheet of regenerated cellulose 0.00088 of an inch in thickness. The coating was leveled by passing the covered sheet under a doctor knife which removed the excess coating composition. The resulting coated sheet was then introduced into a drier through which air was circulating, and where, after a rapid rise in temperature, the coating was dried at a temperature above the melting point of the wax.

*Example XVI*

A moistureproofing coating composition was prepared by dissolving:

| | Parts |
|---|---|
| Beta naphthol rubber product (Ex. XIV type) | 90 |
| Diphenyl guanidine formaldehyde resin | 3 |
| Paraffin wax (M. P. 61° C.) | 10 | in toluene. The solution was applied as a coating to a transparent sheet of regenerated cellulose 0.00088 of an inch in thickness. The coating was leveled by passing the covered sheet under a doctor knife, which removed the excess coating composition. The resulting coated sheet was then introduced into a drier through which air was circulating and where, after a rapid rise in temperature, the coating was dried at a temperature above the melting point of the wax.

*Example XVII*

A moistureproofing coating composition was prepared by dissolving:

| | Parts |
|---|---|
| Beta naphthol rubber product (Ex. XIV type) | 90 |
| Phenol formaldehyde piperazine resin | 3 |
| Paraffin wax (M. P. 61° C.) | 10 | in toluene. The solution was applied as a coating to a transparent sheet of regenerated cellulose 0.00088 of an inch in thickness. The coating was leveled by passing the covered sheet under a doctor knife, which removed the excess coating composition. The resulting coated sheet was then introduced into a drier through which air was circulating and where, after a rapid rise in temperature, the coating was dried at a temperature above the melting point of the wax.

*Example XVIII*

A continuous web of regenerated cellulose was moistureproofed by passing it through a bath consisting of:

| | Parts |
|---|---|
| Beta naphthol rubber product (prepared in the manner described in Ex. XIV, except that only 5 parts of beta naphthol were used) | 80 |
| Diethyl-aminoethyl methacrylate polymer | 5 |
| Paraffin wax (M. P. 61° C.) | 10 |
| Chlorinated diphenyl (Ex. III type) | 5 | dissolved in a suitable solvent, removing the excess solution by passage through doctor rolls and drying at a temperature slightly above the melting point of the wax by passage through a heated chamber in which air was circulated.

*Example XIX*

A continuous web of regenerated cellulose 0.001 of an inch thick was moistureproofed by spraying it with a composition consisting of:

| | Parts |
|---|---|
| Beta naphthol rubber product (prepared in the manner described in Ex. XIV, using 20 parts beta naphthol) | 80 |
| Dibutyl-aminoethyl methacrylate polymer | 4 |
| Paraffin wax (M. P. 61° C.) | 8 |
| Hydrogenated methyl - abietate (Hercolyn grade, prepared according to U. S. A. Patent No. 1,944,241 | 8 | dissolved in a suitable solvent, removing the excess solution by passage through doctor rolls, and drying at a temperature slightly above the melting point of the wax by passage through a drying chamber equipped for air circulation and solvent recovery. In the drying, the temperature of the coated film was rapidly raised to the melting point of the wax, and maintained there until the solvent had been removed from the coating on the sheet. The thickness of the coating was 0.0005 of an inch.

*Example XX*

A moistureproofing coating composition was prepared by dissolving:

| | Parts |
|---|---|
| Beta naphthol rubber product (prepared in the manner described in Ex. XIV, using 40 parts beta naphthol) | 67 |
| Dicyclohexyl aminoethyl methacrylate polymer | 3 |
| Paraffin wax (M. P. 61° C.) | 6 |
| Dicylohexyl phthalate | 7 |
| Dibutyl phthalate | 7 |
| Hydrogenated methyl abietate | 10 | in a suitable solvent. A continuous sheet of regenerated cellulose was passed through a dip bath of this solution, then between doctor knives and into a drying chamber. In the drier the solvent was evaporated at a temperature at least approximately equal to the melting point of the wax in the composition. The resulting sheet was moistureproof, having a permeability value of 10 and a heat seal bond strength of 500.

*Example XXI*

A moistureproofing coating composition consisting of:

| | Parts |
|---|---|
| Beta naphthol rubber product (Ex. XIX type) | 60 |
| Phenol formaldehyde piperazine resin | 5 |
| Paraffin wax (M. P. 61° C.) | 6 |
| Dicyclohexyl phthalate | 12 |
| Dibutyl phthalate | 11 |
| Rosin 2,017,866 [1] | 10 |

[1] This is a "modified rosin" prepared by treating rosin in accordance with U. S. A. Patent No. 2,017,866. In general its properties are much the same as those of rosin, but with the difference that it has a molecular weight within the range 5% to 400% greater than ordinary rosin in its pure state and higher than that of pure abietic acid; that it has a melting point (as determined by the capillary tube method) about 80° C. and higher than the melting point of pure abietic acid and of purified rosin when in the resin state; that it is substantially free from combined sulfur and hardening substances held in combination, and that it has an iodine value lower than that of pure abietic acid.

dissolved in a suitable solvent (toluene), was applied to a continuous sheet of regenerated cellulose by passage of the continuous sheet through a dip bath of the solution. After leaving the bath, the covered sheet passed between doctor knives and into a drying chamber. In the drier the solvent was evaporated at a temperature at least approximately equal to the melting point of the wax, giving a flexible, transparent, moistureproof sheet wrapping material having a permeability value of 10 and a heat seal bond strength of 600.

*Example XXII*

Regenerated cellulose sheet was sprayed with a moistureproofing coating composition consisting of:

| | Parts |
|---|---|
| Beta naphthol rubber product (Ex. XIX type) | 59 |
| Phenol formaldehyde methylamine resin | 5 |
| Paraffin wax (M. P. 61° C.) | 6 |
| Dibutyl phthalate | 10 |
| Dicylohexyl phthalate | 10 |
| Para cumarone indene resin (M. P. in the range 10°–45° C.) | 10 | dissolved in a suitable solvent (benzene—toluene and xylene are also suitable). The sprayed sheet material was passed through doctor knives to remove excess solution, dried at a lower temperature than the melting point (or crystallization point) of the wax in the composition, and then subjected to a heat treatment at a temperature at least equal to the melting point (or crystallization point) of the wax in the composition.

*Example XXIII*

A regenerated cellulose film was moistureproofed by coating it with a composition consisting of:

| | Parts |
|---|---|
| Beta naphthol rubber product (Ex. XIX type) | 40 |
| Diphenyl guanidine formaldehyde resin | 10 |
| Paraffin wax (M. P. 61° C.) | 10 |
| Pliolite [1] | 40 |

[1] Pliolite is a thermoplastic rubber derivative made by condensing (isomerizing, cyclizing) rubber with a catalyst of the tin tetrachloride type (see "Paper Trade Journal" page 96, February 23, 1939, J. I. E. C. XIX 1033, XXVI 125, XXXIII 389, and U. S. A. Patents Nos. 1,797,188, 1,846,247, 1,853,334 and 2,052,391). The chemical structure is described in "Rubber Age", April 1939.

dissolved in a suitable solvent such as xylene (toluene is also suitable).

Example XXIV

A regenerated cellulose film was moistureproofed by coating it with a composition consisting of:

| | Parts |
|---|---|
| Beta naphthol rubber product (Ex. XIX type) | 29 |
| Phenol formaldehyde piperazine resin | 4 |
| Paraffin wax (M. P. 61° C.) | 6 |
| Dibutyl phthalate | 11 |
| Dicyclohexyl phthalate | 11 |
| Rosin 2,017,866 | 10 |
| Chlorinated rubber (65%-68% chlorine) | 29 | dissolved in a suitable solvent such as toluene (xylene is also suitable).

Example XXV

A regenerated cellulose film was moistureproofed by coating it with a composition consisting of:

| | Parts |
|---|---|
| Phenol rubber product [1] | 69 |
| Diphenyl guanidine formaldehyde resin | 5 |
| Paraffin wax (M. P. 61° C.) | 6 |
| Dibutyl phthalate | 5 |
| Dicyclohexyl phthalate | 5 |
| Hydrogenated methyl abietate | 10 |

[1] This product was prepared by milling phenol, $C_6H_5OH$ (4 parts), rubber (100 parts), and dihydroxyfluoroboric acid (4 parts) in the manner described in U. S. A. Patent No. 2,158,530 (Williams). After milling, the excess naphthol was removed by extraction with ethanol.

dissolved in toluene.

Example XXVI

A regenerated cellulose film was moistureproofed by coating it with a composition consisting of:

| | Parts |
|---|---|
| Beta naphthol rubber product (Ex. XIX type) | 6.00 |
| Dimethyl aminoethyl methacrylate polymer | 0.48 |
| Urea formaldehyde monohydric alcohol (isobutanol) resin (solids basis) | 3.24 |
| Maleic acid | 0.36 |
| Paraffin wax (M. P. 61° C.) | 0.72 |
| Dewaxed damar | 1.20 |
| Toluene | 74.80 |
| Isobutanol | 13.20 | dissolved in toluene.

The phenol rubber products are resinous, transparent, thermoplastic, benzene-soluble derivatives of rubber which are resistant to acids and alkalies, which do not adhere to rubber, which have an impact strength similar to phenol aldehyde resins, which impart a hardness to rubber (when compounded therewith) like glue and montan wax, and which are obtained by reacting rubber with a monohydric phenol which contains no substituents other than halogen and hydrocarbon radicals. The phenol rubber products can be hydrogenated at temperatures in the range 80°-200° C. in the presence of an acidic catalyst.

The preparation of the phenol rubber product is described in U. S. A. Patent No. 2,158,530 (Williams), and reference is made thereto for details. For convenience it may be pointed out that the amount of the phenolic material (phenol, naphthol, etc.) may vary widely, the ordinary limits being 5% to 55% (based on the rubber). The products prepared by milling 5 to 20 parts of beta naphthol with 100 parts of rubber in the presence of 4 parts of sulfuric acid as a catalyst, are preferred when the phenol rubber products are employed as an adhesive and as a binder in moistureproofing coatings. Although this type of material was employed in many of the specific examples, it is to be understood that any one or a plurality of the type of products disclosed by the patent just mentioned may be employed, when desired.

The crude product (containing excess phenolic material) is preferred for use in adhesives, and may also be used as produced in the manufacture of moistureproofing coatings if desired, but the best results have been obtained when the excess of the phenol was removed. Ordinary extraction procedures utilizing such materials as alcohol solvents, such as ethanol and butanol, are suitable for removing the unreacted phenolic material. The reaction product may also be purified by dissolving in toluene and precipitating the phenol rubber product with ethyl alcohol (which retains the phenolic body in solution). Treatment of the crude reaction product with formaldehyde renders the excess phenolic material innocuous by causing it to form a phenol formaldehyde resin, whose presence in the composition is not ordinarily objectionable (because it does not exude or blush out as the free phenolic compound would).

Various phenols in addition to the hydroxybenzene and beta naphthol of the examples, for instance, chlorophenol, cresol and dihydroxydiphenyl, may be employed in the manufacture of the phenol rubber product, as indicated in the patent just discussed. One or more phenolic materials may be used in the reaction with the rubber. Catalysts other than the sulfuric acid and dihydroxy-fluorboric acid, for example, organic sulfonic acids, hydroxy-fluorboric acid and boron trifluoride, may be employed.

The phenol rubber products of this invention may be designated by a variety of names other than those already mentioned, for example, "rubber alkylated phenol," "phenol modified rubber," "rubber substituted phenol," and "phenol rubber condensation product." These terms, as used in this application, are intended to apply only to the type of material obtained according to the aforementioned U. S. A. Patent No. 2,158,530. They are not to be construed broadly enough to cover isomers or like derivatives of rubber which might be obtained by using phenol or phenol sulfonic acid in a simple catalytic capacity.

The polymeric basic amino nitrogen-containing substance may be introduced into the phenol rubber product or its composition in any suitable manner, for example, by the use of a mutual solvent, by milling, by grinding or by kneading these materials.

The amino-nitrogen-containing polymers capable of being formed into coherent films, soluble in organic solvents and in 2% aqueous acetic acid and insoluble in water can, for convenience, be divided into sub-groups, as follows:

(A) Resinous polymeric coherent-film-forming reaction products of phenols, aldehydes and material from the group consisting of ammonia, primary amines and secondary amines;

(B) Polymeric coherent-film-forming amino alcohol esters of material from the group consisting of acrylic acid and acrylic acid substituted in the alpha position by a hydrocarbon radical;

(C) Resinous coherent-film-forming reaction products of amino phenols with aldehydes;

(D) Resinous coherent-film-forming reaction products of alphyl ketones (aliphatic and alicyclic) with formaldehyde and material from the group consisting of ammonia, primary amines, secondary amines and tertiary amines;

(E) Resinous coherent-film-forming reaction products of diaryl (especially diphenyl) guanidine with aldehydes (especially formaldehyde);

(F) Resinous coherent-film-forming reaction products of diaryl (especially diphenyl) guanidine with aldehydes (especially formaldehyde) and amines (primary or secondary);

(G) Resinous coherent-film-forming amino alcohol esters of polycarboxylic acids;

(H) Resinous coherent-film-forming aromatic amine aldehyde resins;

(I) Resinous coherent-film-forming reaction products of vinyl ketone polymers with material from the group consisting of ammonia and amines;

(J) Resinous coherent-film-forming reaction products of piperazine aldehydes (especially formaldehyde) and phenols;

(K) Resinous coherent-film-forming reaction products of dimethylol urea dimethyl ether and amines;

(L) Resinous coherent-film-forming reaction products prepared by treating polyvinyl chloroacetate with secondary aliphatic amines;

(M) Resinous coherent-film-forming products resulting from the reaction of urea, formaldehyde, and lower aliphatic (in which the substituent radicals have less than 5 carbon atoms) primary or secondary amines, especially methyl, dimethyl, butyl and dibutyl amines.

(N) Resinous polymeric coherent-film-forming products obtained by polymerizing, in the presence of catalytic proportions of stannic chloride, the reaction product of epichlorohydrin, with material from the group consisting of ammonia and primary aliphatic amines;

(O) Resinous coherent-film-forming reaction products of phenol-lignin with dimethyl amine and formaldehyde;

(P) Resinous coherent-film-forming products obtained by the catalytic hydrogenation of resins having ketone groups at superatmospheric temperature and pressure in the presence of material from the group consisting of ammonia, primary amines an dsecondary amines; and (Q) Resinous coherent-film-forming reaction products of protein material from the group consisting of lower aliphatic aldehydes and lower aliphatic ketones and amines having less than 9 carbon atoms, in which the amino nitrogen is joined to the aliphatic carbon.

This group of highly polymeric amino nitrogen-containing bodies is distinct in that the molecules are built up wholly by artificial means, i. e., they are not synthesized by nature. Their effectiveness is dependent upon polymeric form, since the corresponding monomers do not accomplish the end desired.

The preparation of these basic amino nitrogen-containing polymers is summarized below.

In general, the products of group A are prepared by reacting an aldehyde (preferably formaldehyde) with the appropriate nitrogen compound (ammonia or amine) in aqueous solution to give a methylol derivative (of the ammonia or amine), which is then reacted with the phenol in question. The resin separates from the solution as it is formed, and is usually washed with water before drying. The detailed preparation of these resins is disclosed in the patent literature, see for example, U. S. A. Patent No. 2,098,869 (Harmon & Meigs), particularly Examples A—1, A—7 and A—8, U. S. A. Patent No. 2,168,335 (Heckert), particularly Example A—6, U. S. A. Patent No. 2,168,336 (Heckert), particularly Example A—2, U. S. A. Patent No. 2,031,557 (Bruson), and U. S. A. Patent No. 2,053,092 (Bruson). The preferred combinations are the reaction products of:

| | Mols |
|---|---|
| (1) Phenol | 1 |
| Formaldehyde | 2 |
| Methylamine | 1 |
| (2) Phenol | 0.5 |
| Formaldehyde | 1.4 |
| Dimethylamine | 0.4 |
| Ammonia | 0.5 |
| (3) Phenol | 1 |
| Formaldehyde | 2 |
| Piperazine | 1 |
| (4) Beta-naphthol | 1 |
| Formaldehyde | 2 |
| Methylamine | 1 |
| (5) Phenol | 1 |
| Formaldehyde | 2 |
| N-beta-aminoethyl morpholine | 1 |
| (6) Phenol | 1 |
| Formaldehyde | 2 |
| Ammonia | 1 |
| (7) Phenol | 1 |
| Formaldehyde | 2 |
| Ethylene-diamine | 1 |
| (8) Resorcinol | 1 |
| Formaldehyde | 1 |
| Methylamine | 0.5 |
| (9) Diphenylolpropane | 1 |
| Formaldehyde | 4 |
| Dimethylamine | 2 |
| (10) Xylenol | 1 |
| Formaldehyde | 1.8 |
| Diethanolamine | 0.6 |

In general, the polymeric amino nitrogen-containing bodies of group B are prepared by reacting the appropriate amino alcohol with the methyl ester of the acrylic (or alpha-substituted homolog, preferably methacrylic) acid, distilling off the methanol (thereby forming the monomeric amino alcohol acrylate or homolog), and polymerizing (by any suitable means, such as heat, light or peroxide catalyst). The preparation of polymeric esters of this type are disclosed in detail in U. S. A. Patent No. 2,138,763 (Graves). The polymerization procedures described in U. S. A. Patent No. 2,138,762 (Harmon) are quite suitable. The preferred esters include poly - (beta-diethylaminoethyl - methacrylate), poly-(beta-dimethylaminoethyl - methacrylate), poly-4-(beta - methacrylyloxethyl) - morpholine, poly - (beta - dicyclohexylaminoethyl - methacrylate), triethanolamine - monomethacrylate, and the like.

Resins falling in category C are described in detail in U. S. A. Patent No. 2,147,789 (Graves). The preferred product of this group is that obtained by reacting meta-diethyl-amino-phenol with formaldehyde.

The resinous products of group D are, in general, prepared in the same manner as the preferred material which is the reaction product of acetone, formaldehyde and methylamine. To prepare this material, a solution of 5 parts of trisodium phosphate ($Na_3PO_4 \cdot 12H_2O$) in 50 parts of water was mixed with 50 parts paraformaldehyde. The mixture was cooled in ice, and a solution containing 19 parts (0.61 mol) of methylamine dissolved in 50 parts of acetone, added. A vigorous reaction set in, and cooling was necessary. After the initial reaction was over, the mixture was heated on a steam bath over a reflux condenser for 1¾ hours. It was then allowed to stand overnight. A soft brown, resinous mass resulted. This was well mixed with water to remove unreacted materials separated from the water and dried. The final product was an amorphous, orange-colored solid soluble in glacial acetic acid and not precipitated upon dilution of this solution with water. This resin was partially soluble in alcohol, chloroform and dioxan, and was insoluble in acetone, ethyl acetate and toluene.

The resinous products of group E are in general prepared in the same manner as the preferred material which is the reaction product of diphenyl guanidine with formaldehyde. To prepare this material, 43 parts (0.2 mol) of diphenyl guanidine was mixed with 48.6 parts (0.6 mol) of 37% formaldehyde solution, and the mixture allowed to stand with occasional stirring for 18 hours at a temperature of 50° C. The mixture set to a sticky, taffy-like mass which became progressively harder and more brittle. After 18 hours, the resinous mass was ground under cold water, filtered, washed with water and air dried. The final product was a white, amorphous powder soluble in dilute (2%) acetic acid and toluene.

The polymeric basic amino nitrogen-containing bodies of group F are in general prepared in the same manner as the preferred material which is the reaction product of diphenyl guanidine, formaldehyde and methylamine. To prepare this material, a solution of dimethylol methylamine (1 mol) in water was made by passing 31 parts (1 mol) of methylamine into 160 parts (2 mols) of 37% formaldehyde solution cooled with ice. The solution was added to 215 parts (1 mol) of diphenyl-guanidine, and the mixture stirred for 15 minutes. This gave a dough-like product which was allowed to stand for 22 hours to complete the reaction. At the end of this time the mixture became a hard, resinous mass. It was ground under cold water, filtered, washed with water, and dried over calcium chloride in a vacuum desiccator. The reaction product was a white powder soluble in acetone, ethyl acetate, chloroform, dioxan and toluene.

The resinous products of group G are, in general, prepared in the same manner as the preferred material which is the reaction product of triethanol amine and dimethyl phthalate. To prepare this material, a mixture of 149 parts (1 mol) of triethanol amine, 194 parts (1 mol) of dimethyl phthalate and 800 parts of benzene was charged into a reaction flask, and a solution of 2 parts of sodium in 16 parts of methanol was added in small proportions during the course of the reaction as a catalyst. The mixture was heated at a temperature of 130°–155° C. for 9 hours. During this time a binary of methanol and benzene distilled off. When the theoretical amount of binary had been collected in the receiver, the reaction was stopped and the benzene distilled off on a steam bath under reduced pressure. The residue was a viscous oil which, upon cooling, became a soft, resinous mass. The resinous product was soluble in 20% acetic acid, and films flowed from this solution became hard and brittle on baking at 110° C. for 10 hours. The resinous reaction product was soluble in dioxan, 90% ethyl alcohol, 90% acetone and chloroform, and was partly soluble in toluene.

Resins falling in category H are described in detail in British Patent 342,325. The preferred reaction product in this group is that from aniline and formaldehyde.

Synthetic resins falling in class I are generally prepared by reacting polymeric vinyl ketones with ammonia or primary amines. The conditions of the reaction and the products are described in detail in U. S. A. Patent No. 2,122,707 (Balthis).

The resinous products of group J are in general prepared in the same manner as the preferred material which is the reaction product of formaldehyde, piperazine and phenol. To prepare this material, 162 parts (2 mols) of aqueous 37% formaldehyde was cooled to 15° C., and 190 parts (1 mol) of piperazine hexahydrate in 200 parts of water added drop-wise at such a rate that the temperature did not rise above 23° C. The reaction vessel was cooled in ice, then 94 parts (1 mol) of phenol in 20 parts of water was added all at once and the ice bath removed. The reaction vessel was then raised to a temperature of 35° C. and allowed to stand over night. A light pink, sticky resin, which was washed with water, was obtained.

The polymeric substances of group K are, in general, prepared in the same manner as the preferred materials which are the reaction products of dimethylol urea dimethyl ether with n-butyl-diethanol amine and with hexamethylenediamine. To prepare the first of these materials, 80.5 parts of n-butyl-diethanol amine and 74 parts of dimethylol urea dimethyl ether were mixed and heated in an atmosphere of nitrogen in a bath maintained at 150°–160° C. for 1.5 hours. Methanol (28 parts) was evolved during this time, and a clear, light-yellow resin, soluble in dioxan, trichlorethylene, dilute aqueous acetic acid and hydrochloric acid, was formed. To prepare the second of these products, 29 parts of hexamethylene diamine and 37 parts of dimethylol urea dimethyl ether were mixed and gently heated in a distilling vessel in an oil bath until 7 parts of methanol had distilled. The resinous residue in the distilling vessel was washed with water, dissolved in concentrated hydrochloric acid, and precipitated with aqueous sodium hydroxide. The precipitate was filtered, washed with water and dried. A white, amorphous powder, which was soluble in butanol and dilute aqueous acetic acid, was obtained.

The resinous products of group L are prepared, for example, by dissolving 15 parts of di-n-butyl-amine and 10 parts of polymeric vinyl-alpha-chloroacetate in 80 parts of ethylene glycol-monomethyl ether, allowing the solution to stand in a closed vessel for 2 weeks, pouring into 350 parts of water, filtering off the resin which separates, and drying it. The product prepared in the manner just described is an orange-colored rubbery mass soluble in acetone, ethanol and toluene and in 2% aqueous acetic acid. About 13 parts are obtained by this procedure.

The resinous products of group M may be prepared by dissolving two molecular proportions of urea in three molecular proportions of 37% aqueous formaldehyde, adding one molecular proportion of dimethyl (or other alkyl) amino-methanol dissolved in water (40 parts per mol of compound), and heating for about 13 hours. Evaporation of water leaves a white basic resin.

The resinous products of group N are prepared by the procedures described in U. S. A. Patent No. 1,977,251.

The resinous products of group O are prepared by the process of Example B of U. S. A. Patent No. 2,122,433.

The coherent-film-forming resinous products of group P are, in general, prepared in the same manner as the preferred individual polymers whose properties and mode of preparation are described in U. S. A. Patent No. 2,063,153 (Greenewalt).

The amine polymers of group Q are, in general, prepared in the same manner as the preferred species whose properties and mode of preparation are disclosed in U. S. A. Patent No. 2,143,023 (Meigs).

Instead of simple polymers, interpolymers may be prepared, for instance, by reacting methyl methacrylate and methyl vinyl ketone in the presence of ammonium hydroxide or reacting beta-di-cyclohexyl-aminoethyl methacrylate monomer and beta-dimethylaminoethyl methacrylate monomer together under suitable conditions, or reacting dicyclohexylaminoethyl methacrylate with methyl vinyl ketone under suitable conditions. Other equivalent polymeric materials, such as copolymers, may also be used, provided their solubility characteristics are as previously set forth.

The two classes of basic amino-nitrogen-containing polymers which have given the most satisfactory results are the polymeric amino-alcohol esters of alpha-substituted acrylic acids described in U. S. A. Patents 2,138,762 (Harmon) and 2,138,763 (Graves), and the resins obtained by reacting phenols, formaldehyde and amines described in U. S. A. Patent No. 2,098,869 (Harmon and Meigs).

The latter products, which are dilute acetic acid soluble resins, and with which may be classed the very satisfactory phenol formaldehyde piperazine resins, are obtained by reacting a phenol containing carbon, hydrogen and oxygen only, and having at least 2 unsubstituted nuclear positions ortho or para to the phenolic hydroxyl with formaldehyde and a non-aromatic primary amine containing less than 7 carbon atoms. A molecular ratio of amine to phenol of not less than 0.5:1 and not greater than 1:1, and a molecular ratio of aldehyde to amine not greater than 1:1 in this reaction, give especially desirable results.

The specific compounds which are preferred for the purposes of this invention, are beta-di-n-butylaminoethyl methacrylate polymer; 2-aminocyclohexyl methacrylate polymer; triethanolamine mono-methacrylate polymer; 2-(diethylamino)-cyclohexyl methacrylate polymer; 4-(beta-methacrylyloxyethyl)morpholine polymer; beta-di-methylaminoethyl methacrylate polymer; beta-diethylaminoethyl acrylate polymer; beta-dicyclohexylaminoethyl acrylate polymer; 1-(beta-methacrylyloxyethyl) piperidine polymer; the resin obtained by the hydrogenation, in the presence of ammonia, of polymerized bis-(4-ketocyclohexyl) dimethylmethane; the resin obtained from the hydrogenation, in the presence of ammonia, of polymerized methylvinyl ketone; the reaction product of polymeric methyl alpha-methylvinyl ketone and cyclohexylamine; the reaction products of polymeric methylvinyl ketone and aqueous ammonia (or cyclohexylamine, ethylenediamine, hexamethylenediamine, and the like); the resin obtained by reacting cyclohexanone with formaldehyde and methylamine; and the resinous reaction product of acetone with formaldehyde and butylamine.

The stabilizing effect of the amino polymer is roughly proportional to the amount used with the phenol rubber product. The practical limits are from 0.005 to 1.0 parts of amino polymer per part of phenol rubber product. The improvement obtained by using amounts of amino polymer below the aforementioned lower limit is detectable, but not great enough to be of practical value.

Variations in the proportions of the other ingredients of the stabilized composition are permissible.

In adhesive compositions, the most satisfactory results have been obtained when the amount of the amino polymer used equalled 0.5 to 50.0% of the phenol rubber product. In moistureproofing coating compositions, the most satisfactory results have been obtained when the amount of amino polymer was 0.5% to 30%.

The moistureproofing coating ordinarily employed is a continuous unbroken layer comprising essentially moistureproofing material (material which does not dissolve more than an infinitesimal amount of, if any, water), for example, a waxy (wax-like) substance such as high melting paraffin wax and organic solvent soluble coherent (self-sustaining) cementing (binding, film forming) material therefor, for example, the phenol rubber product or the phenol rubber product containing minor proportions of previously known moistureproofing coating composition film formers. Generally the base film contains softening material, for example, glycerol, and the coating contains plasticizing material, for example dibutyl phthalate, to increase flexibility.

To overcome any haziness which might result from some proportions and combinations of other components of the coating, transparentizing (blending, homogenizing) material, for example, resins and gums such as damar and ester gum, is ordinarily included.

Other auxiliary ingredients are known to the moistureproofing art.

The manufacture of typical base sheet (film, foil, pellicle, skin, tissue, web) is described in U. S. Patents No. 1,548,864 (Brandenberger) and 2,123,883 (Ellsworth). Representative coating compositions, and the application thereof, are set out in U. S. A. Patents No. 1,737,187 (Charch and Prindle), 1,826,697-8 (Charch and Craigue), 2,042,589 (Charch and Hershberger), 2,147,180 (Ubben), 2,159,151 (Hershberger) and 2,169,366 (Meigs).

The adhesive compositions may be applied as solutions (used in a broad sense to include both true solutions and pseudo-solutions, which latter are in reality colloidal suspensions) or melts without any solvent, or melts with reduced amounts of solvent. Although base sheets may be similarly coated with the moistureproofing compositions, in the preferred procedures the moistureproofing coating compositions are applied by passing the base sheet through a bath (solution) containing the coating, or by spraying the coating solution on the base.

Moistureproofing coating compositions may be converted into self-sustaining films having the solids composition set forth, by procedures well known in the art, for example, those disclosed in U. S. A. Patents No. 2,051,201 (Davidson), 176,903 (Izard) and 2,201,747 (Staudt), and may be coated on non-fibrous surfaces other than regenerated cellulose, for example, albuminous material such as casein, gelatine, etc., organic solvent soluble materials such as ethyl cellulose, cellulose acetate, etc., waxed surfaces of shot shell waxed cardboard, and the like.

In forming solutions of the phenol rubber product-amino polymer compositions, aliphatic, aromatic and chlorinated hydrocarbons are suitable. The preferred substances are benzene, toluene, xylene, tetrachlorethane, kerosene, and related products.

Adhesive materials may be prepared by emulsifying a hydrocarbon solution of the adhesive composition in water containing a wetting agent, that is, a material which decreases the surface tension between the hydrocarbon solution and the water. Although a variety of wetting agents may be used, the water soluble salts of alkyl sulfates, in which the alkyl group contains more than 7 carbon atoms, are preferred. Certain organic liquids (solvents) such as acetone, diethyl formamide and ethylene glycol monoethyl ether, may be used for the same purpose. The presence of the ethylene glycol monomethyl ether and dimethyl formamide are particularly desirable in adhesives for moistureproofed regenerated cellulose sheet wrapping material when the presence of a solvent capable of softening the moistureproofing coating is desired.

In preparing the adhesive compositions, resins (natural, synthetic and semi-synthetic) may be incorporated as adjuvants or augmenting agents. The preferred materials of this character include rosin, hydrogenated rosin, hydrogenated rosin derivatives, ester gum, pitches, cumarone indene resins, alkyd (polyhydric alcohol-polycarboxylic acid reaction product) resins, damar, and the like. Such materials compound readily with the phenol rubber product. It will be understood that it is not always desirable to have a resin present. When the presence of resins is desirable, one or more may be used.

Plasticizers (sometimes improperly referred to as softeners) may also be incorporated in the adhesive compositions when desired. The preferred materials of this type are dibutyl phthalate, tricresyl phosphate, chlorinated paraffin, xylyl ethane, chlorinated diphenyls, hydrogenated methyl abietate, di-ethyl-toluene sulfonamide, camphor, hydrocarbon oils, and the like. One or more of material of this character may be present in the adhesive composition, or material of this character may be omitted.

In case it is desired to change the appearance of the stabilized phenol rubber product composition, dyes and/or pigments may be incorporated. Waxes, as well as natural and synthetic resins, etc., may be added to enhance the adhesive and other characteristics of the phenol-rubber product compositions. One or more waxes (used generically to include waxy substances like paraffin wax, as well as true waxes which are monohydric alcohol esters of higher fatty acids) may be employed, as desired.

For adhesive compositions containing 100 parts of phenol rubber product, 0 to 75 parts of transparentizing material (preferably 10 to 40 parts) and 0 to 75 parts of plasticizing material (preferably 10 to 40 parts) are satisfactory. In moistureproofing coating compositions containing 100 parts of phenol rubber product, 0 to 25 (preferably 0 to 10) parts of plasticizing material and 0 to 50 (preferably 0 to 25) parts of transparentizing material, are employed. Such proportions can be applied as melts or solutions.

Various methods of measuring the stabilizing effect of the amino polymer are possible. The heat seal bond strength appears to be the simplest and most satisfactory, both in normal use and in accelerated tests.

The heat seal bond strength value is determined by the following test. Two strips of the coated material 1½ inches wide are superimposed one on the other so that opposite faces of the film are in contact. A seal is made across the width of the material at one end by placing the film on a metal plate heated to 130° C. and rolling thereover a roller ⅝ of an inch wide weighted to 650 grams. The two strips so sealed are opened at the free end and placed in a stretching device, such as a Suter testing machine, by gripping each end of the sheet in suitable clamps, one of which is fixed while the other is moved away at a constant speed of 12 inches per minute. The force in grams required to pull the sheets apart is taken as a measure of the heat seal bond strength.

The following table is representative of the results obtained according to this invention:

*Table I*

A composition consisting of phenol rubber product (Example XIII type) 90 parts, amine polymer 3 parts and paraffin wax 10 parts, was given an accelerated aging test at 95° F. (35° C.) with the results set out below:

| Amine polymer | 0 days | 7 days | 14 days | 28 days | 42 days |
|---|---|---|---|---|---|
| None (control) | 700 | 30 | 20 | 10 | 10 |
| Dimethyl aminoethyl methacrylate polymer | 700 | 600 | 600 | 600 | 600 |
| Phenol formaldehyde-methylamine resin | 700 | 640 | 520 | 100 | 60 |
| Diphenyl guanidine-formaldehyde resin | 700 | 640 | 100 | | |
| Phenol formaldehyde-piperazine resin | 700 | 650 | 650 | 650 | 650 |

In the past great difficulty has been encountered in sealing regenerated cellulose and like sheet material, particularly the moistureproofed varieties. Vast research programs and unbelievable expenditures in testing show that the materials commonly accepted as adhesives were useless in this field. To date only a few materials which will accomplish this purpose at all satisfactorily, have been discovered, and these materials seem to bear no chemical or physical relation to each other. In the formation of envelopes, bags and various other articles from the moistureproofed sheet materials, it is necessary, in order to preserve the moistureproofness, that a good uniform adhesive contact be secured between the different portions of the article in its fabrication. This adhesive contact must be secured without destroying the moistureproof characteristics or substantially impairing the transparency at the place of adhesion. Ordinarily it is also essential that the adhesive should not penetrate into the interior of the sheet to such an extent that it renders the coating on the opposite side of the sheet tacky, because if it does, it may impair the moistureproof qualities of the article, and in addition cause it to stick to other articles with which it may come into contact. The present discovery affords an excellent solution of the problem. The adhesive compositions of this invention are suitable for sealing smooth, non-porous, non-fibrous cellulosic sheets and films (such as those of regenerated cellulose) whether they have a moistureproofing coating composition or not. These compositions are also eminently suited for producing permanently tacky pressure-sensitive adhesive tapes or anchoring other adhesives in the formation of permanently tacky pressure-sensitive adhesive tapes and masking material when coated upon bases such as regenerated cellulose film.

The adhesive compositions of this invention have an application which is broader than the sealing of regenerated cellulose sheet material and moistureproofed regenerated cellulose sheet material. For example, the adhesives are applicable to articles formed of or containing cellulose acetate or cellulose nitrate, to plastics, to artificial leather, to photographic films, to novelties, and the like. The adhesives are also capable of use in joining various materials, such as paper, cardboard, cloth, metal foils, metal sheets and the like to regenerated cellulose and cellulose derivative surfaces. The adhesives of this invention are eminently suited for laminating purposes.

The adhesive compositions are particularly useful in the field of pressure-sensitive adhesives. As anchoring agents they effect a more secure bond between a pressure-sensitive adhesive of the "Scotch tape" type and regenerated cellulose film base. This application of the present invention is one of the most promising so far discovered. The Scotch tape (a recently developed product) ordinarily comprises a ribbon or tape of transparent or translucent regenerated cellulose having on the surface thereof a permanently tacky pressure-sensitive adhesive. The uses of such a material are almost unlimited, although the employment as masking material and joining tape probably constitutes the largest volume of use. These and many other uses of the material involve repeated application and removal of the adhesive tape from the surface. For such a purpose it is highly desirable that the adhesive material adhere firmly to the base sheet, and in particular that it adhere more firmly to the base sheet than to the surface to which such a tape is applied. The anchoring effect of the compositions of this invention are especially notable in this respect. When the anchoring compositions of the present invention are employed, the adhesive material can be completely removed from the surface to which the tape has been applied, with the result that economies such as re-use of the tape and avoidance of cleaning the surface where the tape was applied, are possible. When such tapes are stripped from the surfaces to which they have been adhered, there remains a comparatively clean surface free from tackiness. The adhesive may be applied to the regenerated cellulose ribbon in the conventional manner, as for example, by means of doctor rolls or doctor knives (see U. S. A. Patent No. 2,084,878 to Van Cleef).

The thickness of the adhesive layer in the Scotch tape type product usually falls within the range of 0.001 to 0.01 of an inch. Thicker layers may, of course, be used for special purposes.

By the expressions "pressure sensitive adhesive" and "normally pressure sensitive adhesive" is meant a material which can be caused to adhere to smooth regenerated cellulose sheet by pressure alone at ordinary normal room temperatures. Slight pressures, such as might be exerted by means of a thumb or finger, are contemplated in this definition.

By way of comparison, the adhesion to smooth surfaces obtained with the phenol-modified rubber compositions of this invention is greatly superior to that obtained with rubber, rubber derivatives such as chlorinated rubbers, synthetic rubbers and their derivatives.

Many of the advantages of the present invention are believed apparent from the foregoing part of the specification. The phenol rubber product is stabilized for long periods of time, if not indefinitely, and as a result the compositions containing the same have their useful life extended many times over, even under conditions involving high temperatures and/or strong light.

The adhesive compositions adhere firmly to smooth glass-like surfaces such as those of regenerated cellulose and like non-fibrous sheet material, even when the surface has a moistureproof coating. Their adhesive properties, particularly the length of time during which the adhesive composition is effective, are greatly improved, both in the thermoplastic and pressure-sensitive types.

In the moistureproofing coating composition field the results are even more striking. The moisture-proofing compositions adhere tenaciously to regenerated cellulose and like surfaces over long periods of time, even in the presence of liquid water or under conditions of high relative humidity, and the characteristics of the heat seal bonds (particularly strength) are outstanding. Furthermore, by virtue of their ingredients, such coating compositions are cheaper and more economical than many of those used heretofore extensively. In addition, sheet material having good slip (surface characteristics enabling adjacent sheets in a stick to separate from each other), a desideratum in material for use on automatic machinery, are obtained. The transparency properties are good even in thick coatings.

Moistureproofness, moistureproofing and moistureproof materials and expressions are defined in U. S. A. Patent No. 2,147,180 (Ubben). In the interest of brevity the definitions are not repeated here. The terms and expressions related thereto and employed herein are used in accordance with such definitions.

Adhesive compositions comprising primarily the stabilized phenol rubber product of this invention, can be used advantageously in the sealing of the closures of shotshells. The bond to the waxed surface (paper) remains firm at the temperatures up to 120° F. (49° C.) which are reached in rapid firing, and no deposit or residue remains which accumulates in the gun barrel.

As many apparently widely different embodiments of this invention may be made without departing from the spirit and scope thereof, it is to be understood that this invention is not limited to the specific embodiments thereof except as defined in the appended claims.

I claim:

1. As a new composition of matter, phenol-rubber-product containing 0.5% to 30% of resinous basic amino-nitrogen containing polymer insoluble in water and soluble in organic solvents and 2% acetic acid, said phenol-rubber-product being a reaction product of rubber and at least one phenol, containing 1% to 5% of the phenol material chemically combined with the rubber which is resinous, thermoplastic, benzene soluble, acid resistant, alkali resistant, which does not adhere to rubber, which has an impact strength similar to phenol aldehyde resins, and which imparts a hardness to rubber like glue.

2. As a new composition of matter, naphthol-rubber-product containing 0.5% to 30% of resinous polymeric basic amino-nitrogen-containing compound insoluble in water and soluble in organic solvents and 2% acetic acid, said naphthol-rubber-product being a reaction product of rubber and at least one phenol, containing 1% to 5% of the phenol material chemically combined with the rubber which is resinous, thermoplastic, benzene soluble, acid resistant, alkali resistant, which does not adhere to rubber, which has an impact strength similar to phenol aldehyde resins and which imparts a hardness to rubber like glue.

3. As a new composition of matter, naphthol-rubber-product containing 0.5% to 50% of non-volatile, coherent, self-sustaining, film-forming, polymeric, organic, halogen-free, basic amino-nitrogen containing substance insoluble in water and soluble in organic solvents and 2% acetic acid, said naphthol-rubber-product being a reaction product of rubber and at least one phenol, containing 1% to 5% of the phenol material chemically combined with the rubber which is resinous, thermoplastic, benzene soluble, acid resistant, alkali resistant, which does not adhere to rubber, which has an impact strength similar to phenol aldehyde resins and which imparts a hardness to rubber like glue.

4. Waxed paper coated with an adhesive layer, said layer comprising essentially beta-naphthol-rubber product containing 0.5% to 50% of resinous, basic amino-nitrogen containing polymer insoluble in water and soluble in organic solvents and 2% acetic acid, said beta-naphthol-rubber product being a reaction product of rubber and at least one phenol, containing 1% to 5% of the phenol material chemically combined with the rubber which is resinous, thermoplastic, benzene soluble, acid resistant, alkali resistant, which does not adhere to rubber, which has an impact strength similar to phenol aldehyde resins and which imparts a hardness to rubber like glue.

5. A composition comprising essentially phenol rubber reaction product and basic amino-nitrogen-containing polymer insoluble in water and soluble in organic solvents and 2% acetic acid, the amine polymer being present in an amount within the range 0.5% to 50% of the phenol rubber product, said phenol rubber product being a reaction product of rubber and at least one phenol, containing 1% to 5% of the phenol material chemically combined with the rubber which is resinous, thermoplastic, benzene soluble, acid resistant, alkali resistant, which does not adhere to rubber which has an impact strength similar to phenol aldehyde resins and which imparts a hardness to rubber like glue.

6. An adhesive consisting of 25 parts of phenol rubber reaction product and 6.2 parts of polymeric phenol-formaldehyde-methyl-amine resin, said phenol rubber product being a reaction product of rubber and at least one phenol, containing 1% to 5% of the phenol material chemically combined with the rubber which is resinous, thermoplastic, benzene soluble, acid resistant, alkali resistant, which does not adhere to rubber, which has an impact strength similar to phenol aldehyde resins and which imparts a hardness to rubber like glue.

7. The method of extending the useful life of phenol rubber reaction product which comprises diluting it with 0.5% to 50% basic amino-nitrogen containing polymer insoluble in water and soluble in 2% acetic acid and organic solvents, said phenol rubber reaction product being a reaction product of rubber and at least one phenol, containing 1% to 5% of the phenol material chemically combined with the rubber which is resinous, thermoplastic, benzene soluble, acid resistant, alkali resistant, which does not adhere to rubber, which has an impact strength similar to phenol aldehyde resins and which imparts a hardness to rubber like glue.

8. The composition of claim 3 when the naphthol rubber product is a beta-naphthol-rubber product.

9. The adhesive of claim 6 when the phenol rubber product is a naphthol rubber product.

10. The adhesive of claim 6 when the phenol rubber product is a beta-naphthol-rubber product.

11. The method of claim 7 when the phenol rubber product is a beta-naphthol-rubber-product.

JESSE HARMON.

CERTIFICATE OF CORRECTION.

Patent No. 2,345,597.        April 4, 1944.

JESSE HARMON.

It is hereby certified that error appears in the printed specification of the above numbered patent requiring correction as follows: Page 4, first column, line 63, and second column, line 45, for "Dicylohexyl" read --Dicyclohexyl--; page 6, second column, line 65, for "methacrylyloxethyl" read --methacrylyloxyethyl--; page 9, second column, line 31, for "praffin" read --paraffin--; page 10, second column, line 37, for "stick" read --stack--; and that the said Letters Patent should be read with this correction therein that the same may conform to the record of the case in the Patent Office.

Signed and sealed this 16th day of May, A. D. 1944.

(Seal)

Leslie Frazer
Acting Commissioner of Patents.